Oct. 25, 1966 G. J. WEBER 3,281,558
MULTIPLE CIRCUIT PROTECTOR DEVICE
Filed March 16, 1964 2 Sheets-Sheet 2

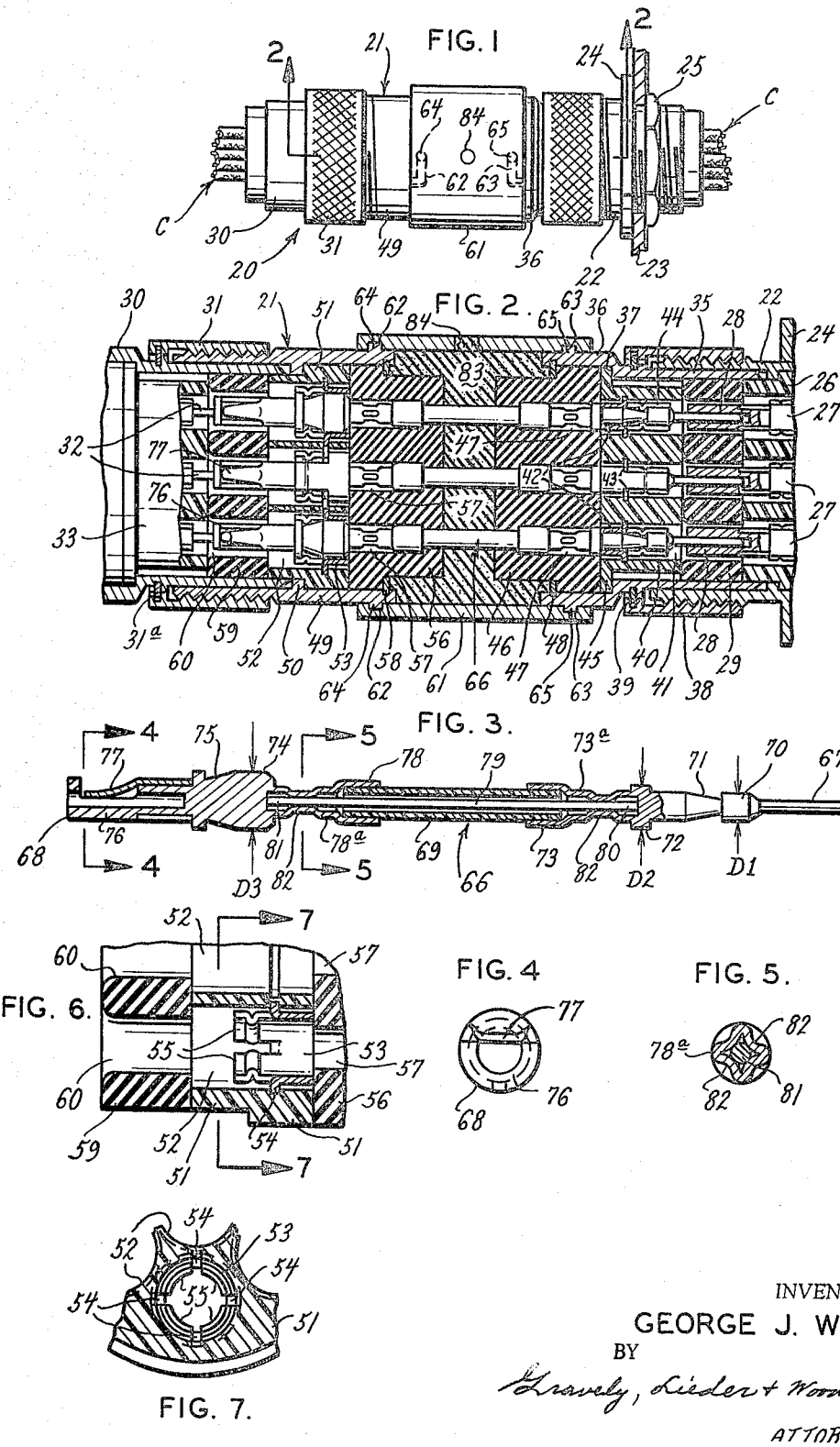

INVENTOR.
GEORGE J. WEBER
BY
Gravely, Lieder & Woodruff
ATTORNEYS

United States Patent Office 3,281,558
Patented Oct. 25, 1966

3,281,558
MULTIPLE CIRCUIT PROTECTOR DEVICE
George J. Weber, Des Peres, Mo., assignor to McDonnell Aircraft Corporation, St. Louis County, Mo., a corporation of Maryland
Filed Mar. 16, 1964, Ser. No. 351,950
4 Claims. (Cl. 200—129)

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to multiple circuit protector devices and is more particularly related to improvements in in-line circuit protector devices.

At the present time multiple circuit wiring layouts usually are made up of wire bundles, or multiple wires arranged as a single cable. The wires frequently have to pass through walls, bulkheads, or the like, and multiple contact plugs and receptacles are usually employed at such points. It is also generally standard practice in such layouts to separate the individual circuit wires and connect each one through a suitable circuit protector board where the wires must be spread out to accommodate the circuit protector spacing on the board. Thus multiple circuit wire bundles or cables generally run to a circuit protector board and then on to the electrical components being provided with current. The circuit protector board must be positioned where it has adequate space, which generally means that it must be remote from the current source and remote from the equipment being served. A difficulty with the foregoing types of installations is that the lines are unprotected between the current source and the place where the circuit protector board is positioned. This leads to short circuit and fire hazards. The bulk of a multiple wire circuit with individual circuit protectors is prohibitive with present types of protective means, and there is no provision made for temporarily fusing all wires during initial power checkouts to avoid damage to equipment.

It is, therefore, an important object of the present invention to provide a protector device for multiple circuit layouts which is lightweight, compact, accurate, and readily serviced for fuse replacement.

It is an object of the present invention to overcome the problems and disadvantages of prior means and devices for protecting electrical equipment by providing a compact protective fuse device which can be used either as a permanent or a temporary part of a system.

An object of the invention is to provide a simple line fuse protector which can be combined with many similar devices to protect a multiple line circuit at any place along the length thereof.

A further object of this invention is to provide an in-line multiple circuit connector with removable fuse means to protect any or all of the lines being connected.

A still further object of this invention is to provide protective fuse means for multiple line connector devices in which it is simple and economical to incorporate a capsule fuse element of any desired capacity.

A further object of this invention is to provide a multiple circuit protective device in which the protective fuse means are compact, in-line assemblies that can be removed and replaced so that fuse elements can be selected for the equipment to be supplied.

Yet a further object of the invention is to provide a conventional multiple line quick disconnect fitting with a fuse element capsule device having push fit pin and socket parts for mating with the two parts of the quick disconnect fitting.

Many additional objects will come to mind as a description of certain preferred forms of the present invention is presented hereinafter in connection with the several views of the drawings.

In one form of the present invention a fused device is provided as a unitary member for a multiple in-line circuit layout so that the unitary member can be inserted between the usual mating bodies of a multiple line connector to introduce fuse protection for all or as many of the circuit lines as may be desired. The fused device includes multiple protective means which have pin and socket parts and an intervening fuse containing capsule, the parts being sized so that a large number of circuit lines in a wire bundle or cable may be protected. The present device also includes means for tapping into any circuit line in the fused device for test purposes or to connect in ammeter or volt meter instruments.

The foregoing broad presentation of the present invention is illustrated, in its major aspects of structure, in and by the accompanying drawings, wherein:

FIG. 1 is a fragmentary assembly view in side elevation of a multiple circuit protector device as installed in a wall shown in section;

FIG. 2 is a longitudinal sectional view on a greatly enlarged scale of the device seen at line 2—2 in FIG. 1;

FIG. 3 is an enlarged partly sectioned view of a typical single protective fuse means for electrical circuits;

FIG. 4 is a transverse sectional view at line 4—4 in FIG. 3;

FIG. 5 is another transverse sectional view at line 5—5 in FIG. 3;

FIG. 6 is a greatly enlarged fragmentary sectional view of means for locking the circuit protector in position;

FIG. 7 is a fragmentary transverse sectional view at line 7—7 in FIG. 6;

Figure 8:
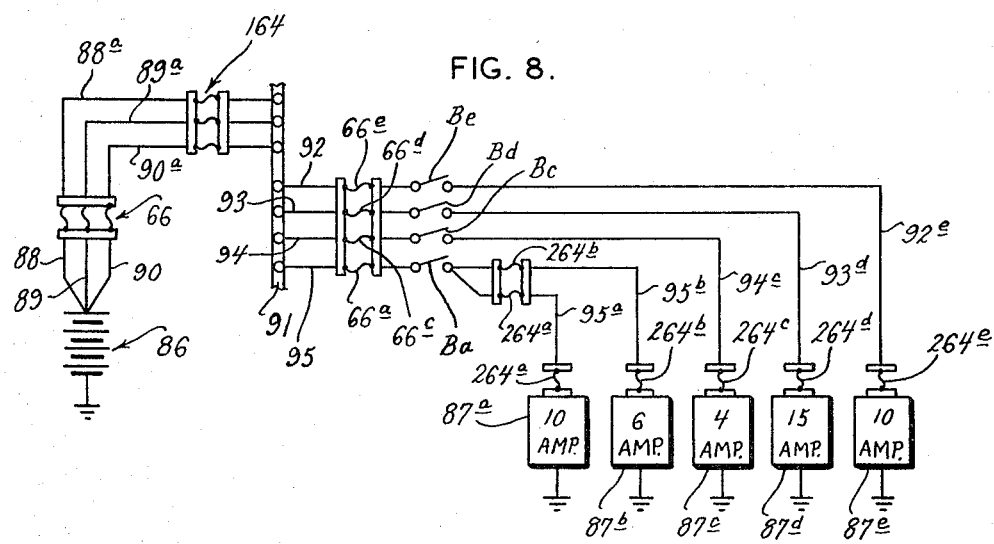
FIG. 8 is a schematic circuit layout in which the protector devices are incorporated.

In FIGS. 1 and 2 there is shown an assembly 20 for a bundle or cable of circuit wires C in which the central portion 21 is the protective fuse device of the invention. The assembly 20, in addition to the central portion or fuse device 21, is composed of a right hand fitting 22 mounted in a wall, bulkhead, or the like, 23 by means of nuts 24 and 25. The fitting 22 is a sleeve having external threads and enclosing a body of plastic material 26 which supports locking clips 27 having pin sockets 28. The sockets 28 are located in a body of rubber 29 which is adjacent the body of plastic 26, and there is a circumferential space between the rubber 29 and the sleeve 22.

In the standard or normal application of wire bundle or cable connectors the fitting sleeve 22 would normally receive a tubular projection 30 of a cooperating fitting, and a coupling member 31 would thread onto the sleeve 22. Also in the normal assembly of fitting 30, the pin elements 32 in the sleeve projection 30 which are supported by a body of plastic material 33, would fit into the sockets 28. After the coupling member 31 held by a snap ring 31a draws the fittings 22 and 30 together, the plastic 33 then would abut the body of rubber 29 to form a seal. The parts described above are standard and do not, per se, form a part of the invention.

The improved device of this invention is the central portion 21 of the assembly shown in FIG. 1 and in enlarged section in FIG. 2. The device includes a right hand connector sleeve 35 having an enlarged end 36 forming an internal shoulder 37. The sleeve 35 carries a coupler 38 which is fixed against axial movement by a snap ring 39 but is free to rotate for purposes of threading engagement over the threaded fitting 22. The enlarged end 36 of the sleeve 35 receives a body of plastic material 40 having as many apertures 41 as needed for the wires in the cable C. Each aperture 41 supports a resilient releasable locking clip 42 having tabs 43 turned out to grip the plastic 40 and axial fingers 44 to grip the pin member on the end of the fuse means to be described in conjunction with FIG. 3. The plastic body 40 has a flange 45 which seats on shoulder 37, and it also is a seat for a body 46 of rubber in which apertures 47 match with apertures 41. The rubber body 46 is retained in the sleeve 36 by a snap ring 48 of usual character.

The device of FIG. 2 also has a left hand connector sleeve 49 formed with threads on its outer end to be engaged by the coupling member 31 carried by sleeve projection 30. A body of rubber material 59 having apertures 60 is confined within sleeve projection 30 against plastic material 33. Pins 32 project into corresponding apertures 60 of rubber material 59. The sleeve 49 has an internal annular rib 50 which is a seat for a body of plastic material 51. The body 51 is formed with apertures 52 to receive resilient, releasable locking clips 53 (similar in design and construction as clips 42) having out-turned tabs 54 gripping the plastic body 51 and axial fingers 55 to grip the receptacle member on the fuse means depicted in FIG. 3. A body of rubber 56 with apertures 57 to match apertures 52 seats on the plastic body 51 and is held in place by a snap ring 58. Sleeve 49 when fully engaged by coupling member 31 holds plastic body 51 in firm abutment with rubber material 59. The apertures 52 and 57 line up with apertures 47 and 41, as is shown in FIG. 2. The apertures 60 in rubber material 59 are designed to receive the receptacle member of the fuse means engaging pins 32.

The internal parts of the improved device, as described above, are first assembled in the connector sleeves 35 and 49, and then the sleeves are joined by a barrel 61 having substantially precisely spaced internal locking pin receiving grooves 62 and 63 which receive pin elements 64 and 65, respectively, on the sleeves 49 and 35. The barrel 61 thus retains the connector sleeves 35 and 49 at a controlled dimension indicated by the spacing between grooves 62 and 63 (FIG. 2) so that the protective fuse means 66 including the fuse element and capsule may be made in bulk quantities at an interchangeable standard dimension. By controlling the dimension of the above, the fuse element electrical characteristics are controlled by the element or wire diameter or material.

A plurality of fuse means 66 are contained in the central portion 21 of the assembly. As best illustrated in FIG. 3, each means 66 includes a pin member 67, a receptacle member 68 and a fuse containing capsule 69 supported therebetween. The pin member 67 has an enlarged base 70, a tapered recess 71 adjacent the base, a stop flange 72 inwardly of the recess, and a socket 73 spaced from the stop flange by a reduced diameter tubular shank 73a. Cooperating with the pin member 67 is the receptacle member 68 which has a body 74 formed with a tapered recess 75 and an adjacent socket 76 carrying a clip element 77. The body 74 is formed with a second socket 78 and a reduced diameter tubular shank 78a. The members 67 and 68 are positioned in spaced relation by the capsule 69, and a fuse element 79 is disposed within the capsule 69 with one end portion 80 extending into the shank 73a and the opposite end portion 81 extending into the shank 78a. Electrical contact is established by crimping the shanks 73a and 78a onto the fuse ends 80 and 81 as shown at 82 in FIG. 5. The crimping 82 also retains the members 65 and 66, and the capsule 67 in assembly.

The fuse elements 79 may be any of the usual fusible materials or copper wires of desired electrical character to rupture upon flow of excessive current. The capsule 69 may be plastic tubing to insulate and support the fuse element 79 in assembly. Since the barrel 59 retains the sleeves 35 and 49 in a precise spaced relation, there is a known dimension established between the pin receiving sockets 28 in fitting 22 and the pin elements 32 in fitting 30. In like manner, the body of plastic material 40 is located by the shoulder 37 such that the releasable locking clips 42 are precisely positioned in the sleeve 35, and the body of plastic material 51 is located by the rib 50 in sleeve 49 so that the releasable locking clips 53 have a precise spacing relative to clips 42. The bodies of rubber 46 and 56 form a yieldable support for the sockets 73 and 78, respectively, of the protective fuse means 66. No strain is placed upon the protective fuse means 66, and after the parts are assembled as seen in FIG. 2, a suitable silicone potting material 83 is injected through the barrel aperture 84. The potting material provides water proofing for the means 66 and acts as a support and guide for the means 66 when removing the same to replace a blown fuse element.

Individual protective fuse means 66 may be axially pushed out of the device 21 for replacement. This is accomplished by inserting a tool (not shown) over the pin member 67 and pushing the means 66 out at the opposite end. To facilitate removal, the means 66 has its pin base 70 formed of a diameter D1 which is smaller than the diameter D2 for the stop flange 72, and flange 72 has a diameter smaller that the diameter D3 for the body 74 of the receptacle member 68. It is also seen that the axial apertures 47 and 57 in the respective bodies 46 and 56 of rubber material have a diameter which receives the flange 72 of diameter D2. The removing tool fits over any of the exposed pin members 67 and spreads the fingers of locking clip 42 so that the base 70 can pass the clip 42. During this operation the taper 75 on the body 74 will spread the fingers 55 of the clip 53 and release the fuse means, the rubber bodies 46 and 56 yielding sufficiently for the removal operation. The replacement fuse means is installed in the empty place by a similar operation of pushing a new fuse means in place until the clips 42 and 53 become effective to hold the same in the proper location.

In FIG. 8 there is shown a schematic wiring diagram in which a source 86 of electrical potential is connected to a system load made up of items 87a, 87b, 87c, 87d and 87e. It is assumed that item 87a draws 10 amperes, item 87b draws 6 amperes, item 87c draws 4 amperes, item 87d draws 15 amperes and item 87e draws 10 amperes. The diagram is made simple by showing a grounded circuit so that a single lead circuit results. In the diagram, protective fuse means of the type shown at 21 in FIG. 2 is inserted in the leads 88, 89 and 90, each lead being connected to a fuse 66 of 15 amperes so that the source 86 has 45 amperes of current available for the system. The fuses 66 are located right at the source 86 so that the leads 88a, 89a and 90a are protected against short circuit hazards. The system includes a bus-bar 91 capable of carrying the full 45 amperes of current. Since the bus-bar 91 may be at a considerable distance from the electrical source 86, it is possible to insert the protective fuse device 21 at an intermediate location as shown at 164 in FIG. 8. The individual fuse means are 15 amperes. From the bus-bar 91 lead 92 connects with a fuse means 66e which can be 10 amperes to agree with the ampere requirements for item 87e which is on the lead 92e. A switch Be is usually included in the lead 92e. Similarly lead 93 includes fuse means 66d of 15 amperes, a switch Bd and lead 93d connected to item 87d. The next lead 94 from bus-bar 91 includes fuse means 66c of 4 amperes, a switch Bc and lead 94c connected to item 87c. The next lead 95 from the bus-bar 91 includes fuse means 66a of 16 amperes, switch Ba and branch leads 95b and 95a, lead 95a connecting to item 87a and lead 95b connecting to item 87b. The fuse means 66a, 66c, 66d and 66e are combined in the protective fuse device 21 shown in FIGS. 1 and 2.

It should be understood that normally switches Ba, Bc, Bd and Be are not all closed at the same time such that the maximum load current of items 87a through 87e would be required at any given time.

As shown in FIG. 8, individual fuse means 264a and 264e are disposed in leads 95a, 95b, 94c, 93d and 92e respectively so that protection is obtained at the several items making up the electrical load of the system. This fusing permits only the predetermined current to enter the equipment, regardless of external incentives. Also with the items protected by optimum fusing the leads may be sized to carry the individual currents at a considerable weight saving over leads sized to carry the maximum current. For example, in FIG. 8 item 87a draws 10 amperes and is protected by a 10 ampere fuse means 264a so that the lead 95a needs to be only a No. 18 wire, rather than a No. 16 wire for a 15 ampere current. Similarly, with item 87b drawing 5 amperes and protected by a 6 ampere fuse means 264b the lead 95b can be No. 20 size. Thus, there is a weight saving in the system of this inprovement.

Figure 9:
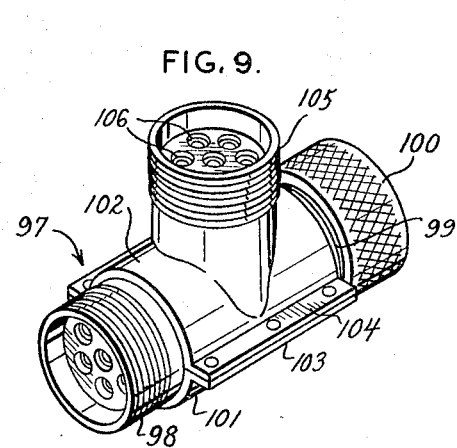
FIG. 9 is a perspective view of a modified protector device for use in test circuits.
Figure 10:
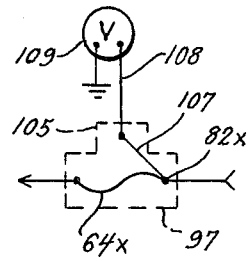
FIG. 10 is a schematic circuit arrangement for a fused line with a tap for a voltmeter.
Figure 11:
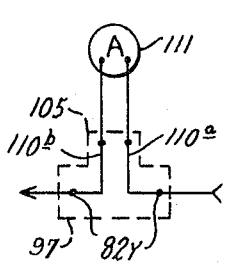
FIG. 11 is a schematic circuit arrangement for an ammeter connection.
Figure 12:
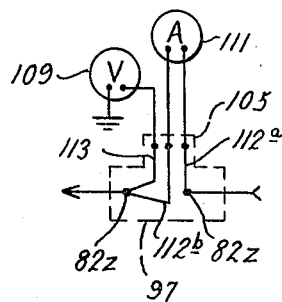
FIG. 12 is a schematic circuit arrangement combining the provisions shown in FIGS. 10 and 11.

In FIG. 9, a modified assembly is shown for purposes of providing taps for circuit monitoring instruments, such as ammeters or voltmeters. The assembly 97 includes an end sleeve 98 similar to sleeve 49 in FIG. 2 and an opposite end sleeve 99 and threaded coupler 100 similar to sleeve 35 and coupler 38 in FIG. 2. In place of the barrel 59 of FIG. 2, the modified assembly has a split barrel composed of semi-cylindrical parts 101 and 102 connected at flanges 103 and 104 respectively. The part 102 is provided with a tubular extension 105 to house a plurality of pin receiving socket means 106. It is assumed that the internal construction of the modified assembly 97 is like that of FIG. 2 in which fuse means 66 are provided. It can now be appreciated on comparison of FIGS. 10 and 9 that a fuse means 66x in the assembly 97 can be provided with a tap at crimped end 82x for lead 107 which goes to one of the sockets 106 for connection with a suitable pin (not shown) on lead 108 to a voltmeter 109. In FIG. 11, a fuse means has been removed and the spaced crimped ends 82y which would normally be used for the fuse now provide taps for respective leads 110a and 110b running to separate sockets 106 in the extension 105. An ammeter 111 can be placed across an arrangement in the modified assembly 97 for tapping into the crimped ends 82z with leads 112a and 112b, and a lead 113, all of which are connected to sockets 106 in the extension 105. The leads 112a and 112b are associated with the ammeter 111, while lead 113 is associated with voltmeter 109.

It can be appreciated that the structure of the central portion or protective fuse device 21 in FIGS. 1 and 2 can be made up as a unit with many such units available for different fuse ratings. It is also to be understood that when a fuse means 66 blows, the same may be removed and a replacement inserted all without having to dismantle or otherwise disturb the unit. The protective fused means may be temporarily inserted in a wire harness wherever the same has a coupling of the type shown at sleeve 22 and coupler 31. Also, the modified unit 97 may be temporarily or permanently used in a system of the character disclosed to provide connections for system monitoring devices.

The foregoing disclosure is intended to set forth the principles of the present invention without specifically showing every possible variation, but it is understood that such variations are to be included within the scope of the appended claims.

What is claimed is:

1. A fuse device for multi-circuit cable coupler comprising a resilient body having axial apertures therethrough, a shell surrounding said resilient body, said shell having a latching element near each end thereof, a first coupler member adapter to mate one section of the cable coupler having complementary elements for said latching element, said first coupler member having one rigid insert and one resilient insert retained therein, said one rigid insert and said one resilient insert having axial apertures therein aligned with the apertures in said resilient body, said one rigid insert retaining releasable locking means in some of the apertures therein, a second coupler member adapted to mate the other section of the cable coupler having complementary elements for said latching element, said second coupler having another rigid insert and another resilient insert retained therein, said another rigid insert and said another resilient insert having axial apertures therein aligned with the aperture in said resilient body, said another rigid insert retaining releasable locking means in apertures aligned with said some of the apertures, said first coupler member and one rigid insert, said second coupler member and another rigid insert and said shell cooperating to maintain a predetermined separation between locking means of said first coupler member and said second coupler member, and a fuse element releasably retained within at least one sequence of the aligned apertures of the fuse device by said locking means of said first and second coupler member engaging complementary locking elements on said fuse element, said fuse element affording electrical continuity up to predetermined power load between aligned sections of said cable coupler.

2. A fuse device for a multiple circuit cable coupler comprising a resilient body having axial apertures therethrough, a shell surrounding said resilient body, said shell having a spacer element near each end thereof, a first coupler member adapted to mate one section of the cable coupler having complementary elements for said spacer element, said first coupler having one rigid insert and one resilient insert retained therein, said one rigid insert and said one resilient insert having axial apertures therein aligned with the apertures in said resilient body, said one rigid insert retaining releasable locking means in some of the apertures therein, a second coupler member adapted to mate the other section of the cable coupler having complementary elements for said spacer element, said second coupler having another rigid insert and another resilient insert retained therein, said another rigid insert and said another resilient insert having axial apertures therein aligned with the aperture in said resilient body, said another rigid insert retaining releasable locking means in apertures aligned with said some of the apertures, a fuse element releasably retained within the aligned apertures of the fuse device by said locking means of said first and second coupler members engaging complementary locking elements on said fuse element, said fuse element affording electrical continuity up to predetermined power load between aligned sections of said cable coupler.

3. The fuse device of claim 2 including a third coupler member retaining a plurality of monitoring contact members wherein at least one of said contact members communicates with at least one aperture of either rigid insert to provide electrical connection into the coupler circuits.

4. In an electrical circuit protector device: a housing having opposite open ends; a pair of axially spaced releasable locking elements carried in said housing respectively adjacent said opposite open ends, said locking elements having resilient elements facing outwardly of said respective opposite open housing ends and one of said locking elements being larger than the other; a fused circuit making assembly in said housing releasably carried by said pair of locking elements, said assembly including an elongated fuse, a first member engaged with one end of said fuse and having a base portion engaged in the smaller one of said locking elements, and a second member engaged with the opposite end of said fuse and having a body axially spaced from said base portion and engaged in said larger one of said locking elements; and material in said housing to support said fused circuit making assembly, said material holding said pair of locking elements in substantially fixed spaced relation to match the axial spacing of said base and body portions, said assembly being bodily replaceable through said larger locking element, said locking elements remaining fixed.

References Cited by the Examiner

UNITED STATES PATENTS

| | | | |
|---|---|---|---|
| 1,537,296 | 5/1925 | Gearhart | 200—133 |
| 1,729,877 | 10/1929 | Jennings | 317—119 |
| 1,813,582 | 7/1931 | Mason | 200—115.5 |
| 2,563,762 | 8/1951 | Uline et al. | |
| 2,647,970 | 8/1953 | Edsall et al. | 200—120 |
| 2,707,736 | 5/1955 | Hollins | 200—115.5 |
| 2,785,319 | 3/1957 | Simpson et al. | |
| 3,156,801 | 11/1964 | Cole et al. | 200—120 |

BERNARD A. GILHEANY, *Primary Examiner.*

B. DOBECK, *Examiner.*

H. B. GILSON, *Assistant Examiner.*